US012404637B2

(12) United States Patent

Beainy et al.

(10) Patent No.: US 12,404,637 B2

(45) Date of Patent: Sep. 2, 2025

(54) AMPLITUDE ADJUSTMENT MECHANISM FOR A VIBRATORY MECHANISM OF A SURFACE COMPACTION MACHINE

(71) Applicant: Volvo Construction Equipment AB, Eskilstuna (SE)

(72) Inventors: Fares Beainy, Mechanicsburg, PA (US); Maciej Karcz, Loslow (PL); Lukasz Rembisz, Medlow (PL)

(73) Assignee: Volvo Construction Equipment AB, Eskilstuna (SE)

( * ) Notice: Subject to any disclaimer, the term of this patent is extended or adjusted under 35 U.S.C. 154(b) by 601 days.

(21) Appl. No.: 17/908,951

(22) PCT Filed: Mar. 4, 2020

(86) PCT No.: PCT/IB2020/051880

§ 371 (c)(1),
(2) Date: Sep. 2, 2022

(87) PCT Pub. No.: WO2021/176250

PCT Pub. Date: Sep. 10, 2021

(65) Prior Publication Data

US 2023/0086685 A1 Mar. 23, 2023

(51) Int. Cl.

*E01C 19/28* (2006.01)
*B06B 1/16* (2006.01)
*E02D 3/074* (2006.01)

(52) U.S. Cl.

CPC ............ *E01C 19/286* (2013.01); *B06B 1/164* (2013.01); *E02D 3/074* (2013.01)

(58) Field of Classification Search

CPC .......... E01C 19/286; B06B 1/16; E02D 3/074

(Continued)

(56) References Cited

U.S. PATENT DOCUMENTS 4,350,460 A 9/1982 Schmelzer et al.
4,759,659 A 7/1988 Copie
(Continued)

FOREIGN PATENT DOCUMENTS

CN 200940250 Y 8/2007
CN 103046455 A 4/2013
(Continued)

OTHER PUBLICATIONS

International Search Report and Written Opinion of the International Searching Authority, PCT/IB2020/051880, mailed Dec. 9, 2020, 14 pages.

(Continued)

*Primary Examiner* — Raymond W Addie

(74) *Attorney, Agent, or Firm* — Sage Patent Group

(57) ABSTRACT

An adjustment mechanism for a vibratory mechanism of a surface compaction machine, the adjustment mechanism includes a torque limiter coupled between the first eccentric shaft and the second eccentric shaft that prevents relative rotation between the shafts and a phase adjustment between the shafts when a net torque applied to the torque limiter is less than a locking torque threshold. Application of a net torque to the torque limiter that is greater than or equal to the locking torque threshold causes the first eccentric shaft to rotate with respect to the second eccentric shaft. An actuator subassembly selectively applies a linear force cause a first torque to be applied the first eccentric shaft sufficient to apply a net torque to the torque limiter that is greater than or equal to the locking torque threshold to cause the first eccentric shaft to rotate with respect to the second eccentric shaft.

20 Claims, 7 Drawing Sheets

(58) Field of Classification Search
USPC .................................................. 404/75, 117
See application file for complete search history.

(56) References Cited

U.S. PATENT DOCUMENTS

| | | | |
|---|---|---|---|
| 5,967,696 | A | 10/1999 | Allen et al. |
| 9,334,621 | B2 * | 5/2016 | Persson ..................... F16C 3/18 |
| 9,725,855 | B2 * | 8/2017 | Kreische ............... E01C 19/286 |
| 10,227,737 | B1 | 3/2019 | Goebel |
| 2003/0021629 | A1 * | 1/2003 | Swanson ............... E01C 19/286 404/117 |
| 2010/0147090 | A1 | 6/2010 | Kuerten |
| 2014/0064850 | A1 | 3/2014 | MacDonald et al. |
| 2018/0230673 | A1 | 8/2018 | Lee et al. |
| 2019/0242466 | A1 * | 8/2019 | Brieschke ............. F16H 55/171 |
| 2020/0018019 | A1 | 1/2020 | Rudge |

FOREIGN PATENT DOCUMENTS

| | | | | |
|---|---|---|---|---|
| CN | 108474185 | A | 8/2018 | |
| DE | 10135015 | A1 * | 2/2003 | ............... B06B 1/16 |
| DE | 202011108648 | U1 | 1/2012 | |
| EP | 2172279 | A1 | 4/2010 | |
| JP | 2004263486 | A | 9/2004 | |
| NO | 20181247 | A1 | 8/2019 | |
| WO | 2013135215 | A1 | 9/2013 | |
| WO | 2019103724 | A1 | 5/2019 | |

OTHER PUBLICATIONS

First Office Action for Chinese Patent Application No. 202080098108.2, mailed Jun. 9, 2023, 10 pages.

* cited by examiner

700

AMPLITUDE ADJUSTMENT MECHANISM FOR A VIBRATORY MECHANISM OF A SURFACE COMPACTION MACHINE

CROSS REFERENCE TO RELATED APPLICATIONS

This application is a 35 U.S.C. § 371 national stage application of PCT International Application No. PCT/IB2020/051880 filed on Mar. 4, 2020, the disclosure and content of which is incorporated by reference herein in its entirety.

FIELD

Embodiments relate to a vibratory mechanism, and more particularly to an amplitude adjustment mechanism for a vibratory mechanism of a surface compaction machine.

BACKGROUND

Surface compaction machines are used to compact a variety of substrates including soil, asphalt, or other materials. Surface compaction machines are provided with one or more compacting surfaces for this purpose. For example, a surface compaction machine, such as a roller compactor, may be provided with one or more cylindrical drums that provide compacting surfaces for compacting substrates.

Roller compactors use the weight of the compactor applied through rolling drums to compress a surface of the substrate being rolled. In addition, one or more of the drums of some roller compactors may be vibrated by a vibration system to induce additional mechanical compaction of the substrate being rolled. The vibration system of these surface compaction machines can include an eccentric vibration system that includes an eccentric mass that is rotated to generate a vibration force which increases the compacting force exerted by the drum.

These and other vibration systems may produce vibrations at different amplitudes by changing a combined center of mass of eccentric masses within the vibration system. These adjustments typically need to be performed manually, while the vibratory mechanism and surface compaction machine are not operating.

SUMMARY

According to an embodiment, an adjustment mechanism for a vibratory mechanism of a surface compaction machine includes a screw coupled to a first eccentric shaft that is rotatable about an axis of rotation. The adjustment mechanism further includes a nut coupled to a second eccentric shaft that is rotatable about the axis of rotation, wherein the screw is disposed within the nut. The adjustment mechanism further includes a torque limiter coupled between the first eccentric shaft and the second eccentric shaft. The torque limiter prevents relative rotation between the first eccentric shaft and the second eccentric shaft and a phase adjustment between the first eccentric shaft and the second eccentric shaft when a net torque applied to the torque limiter is less than a locking torque threshold. Application of a net torque to the torque limiter that is greater than or equal to the locking torque threshold causes the first eccentric shaft to rotate with respect to the second eccentric shaft. The adjustment mechanism further includes an actuator subassembly coupled to the screw to selectively apply a first linear force to the screw in a linear direction parallel to the axis of rotation to cause the screw to apply a first torque to the first eccentric shaft. Application of the first torque to the first eccentric shaft causes the first eccentric shaft to apply the first torque to the first eccentric shaft sufficient to apply a net torque to the torque limiter that is greater than or equal to the locking torque threshold to cause the first eccentric shaft to rotate with respect to the second eccentric shaft.

According to another embodiment, a vibratory mechanism for a surface compaction machine includes a housing disposed within a compactor drum of the surface compaction machine. The vibratory mechanism further includes an eccentric shaft subassembly comprising a first eccentric shaft disposed within the housing, wherein the first eccentric shaft is rotatable about an axis of rotation, the eccentric shaft comprising a first eccentric mass having a first center of mass that is offset from the axis of rotation. The eccentric shaft subassembly further includes a second eccentric shaft disposed within the housing, wherein the second eccentric shaft is rotatable about the axis of rotation, the second eccentric shaft comprising a second eccentric mass having a second center of mass that is offset from the axis of rotation. The eccentric shaft subassembly further include a ball screw subassembly comprising a ball screw coupled to the first eccentric shaft, a ball nut coupled to the second eccentric shaft, wherein the ball screw is disposed within the ball nut, and a plurality of ball bearings disposed between the ball screw and the ball nut to reduce mechanical friction between the ball screw and the ball nut. The vibratory mechanism further includes a torque limiter coupled between the first eccentric shaft and the second eccentric shaft. The torque limiter prevents relative rotation between the first eccentric shaft and the second eccentric shaft and a phase adjustment between the first eccentric shaft and the second eccentric shaft when a net torque applied to the torque limiter is less than a locking torque threshold. Application of a net torque to the torque limiter that is greater than or equal to the locking torque threshold causes the first eccentric shaft to rotate with respect to the second eccentric shaft. The vibratory mechanism further includes an actuator subassembly coupled to the ball screw to selectively apply a first linear force to the ball screw in a linear direction parallel to the axis of rotation to cause the ball screw to apply a first torque to the torque limiter via the first eccentric shaft. The vibratory mechanism further includes a motor coupled to the second eccentric shaft to apply a second torque to the torque limiter via the second eccentric shaft. The second torque does not overcome the locking torque threshold, and the first torque and the second torque cause the net torque that is greater than or equal to the locking torque threshold to cause the first eccentric shaft to rotate with respect to the second eccentric shaft.

According to another embodiment, a method of adjusting a vibratory mechanism of a surface compaction machine includes operating a motor to apply a first torque to a first eccentric shaft about an axis of rotation to rotate the first eccentric shaft. The first torque is less than a locking torque threshold of a torque limiter coupled to the first eccentric shaft. Rotating the first eccentric shaft causes concurrent rotation of a second eccentric shaft coupled to the torque limiter. The method further includes operating an actuator to selectively apply a second torque to the second eccentric shaft about the axis of rotation. The first torque and the second torque apply a net torque to the torque limiter that is greater than or equal to the locking torque threshold of the torque limiter. Applying the first torque and the second torque causes the second eccentric shaft to rotate with respect to the first eccentric shaft.

Other devices, methods, and systems according to embodiments will be or become apparent to one with skill in the art upon review of the following drawings and detailed description. It is intended that all such additional surface compaction machines, methods, and control systems be included within this description and protected by the accompanying claims. Moreover, it is intended that all embodiments disclosed herein can be implemented separately or combined in any way and/or combination.

Aspects

According to an aspect, an adjustment mechanism for a vibratory mechanism of a surface compaction machine includes a screw coupled to a first eccentric shaft that is rotatable about an axis of rotation. The adjustment mechanism further includes a nut coupled to a second eccentric shaft that is rotatable about the axis of rotation, wherein the screw is disposed within the nut. The adjustment mechanism further includes a torque limiter coupled between the first eccentric shaft and the second eccentric shaft. The torque limiter prevents relative rotation between the first eccentric shaft and the second eccentric shaft and a phase adjustment between the first eccentric shaft and the second eccentric shaft when a net torque applied to the torque limiter is less than a locking torque threshold. Application of a net torque to the torque limiter that is greater than or equal to the locking torque threshold causes the first eccentric shaft to rotate with respect to the second eccentric shaft. The adjustment mechanism further includes an actuator subassembly coupled to the screw to selectively apply a first linear force to the screw in a linear direction parallel to the axis of rotation to cause the screw to apply a first torque to the first eccentric shaft. Application of the first torque to the first eccentric shaft causes the first eccentric shaft to apply the first torque to the first eccentric shaft sufficient to apply a net torque to the torque limiter that is greater than or equal to the locking torque threshold to cause the first eccentric shaft to rotate with respect to the second eccentric shaft.

According to another aspect, the screw comprises a ball screw, and the nut comprises a ball nut. The adjustment mechanism further comprises a plurality of ball bearings disposed between the ball screw and the ball nut to reduce mechanical friction between the ball screw and the ball nut.

According to another aspect, the torque limiter further comprises a ball detent mechanism to selectively lock the first eccentric shaft with respect to the second eccentric shaft in one of a plurality of rotational positions when the net torque applied to the torque limiter is less than the locking torque threshold.

According to another aspect, the torque limiter further comprises a slip clutch mechanism to selectively lock the first eccentric shaft with respect to the second eccentric shaft when the net torque applied to the torque limiter is less than the locking torque threshold.

According to another aspect, the adjustment mechanism further includes a sensor coupled to the torque limiter to measure a change in rotational position of the first eccentric shaft with respect to the second eccentric shaft.

According to another aspect, the actuator subassembly further comprises a linear actuator, a screw hub coupled to the screw, and a lever coupled between the linear actuator and the screw hub. Actuation of the linear actuator causes the lever to apply the first linear force to the screw to apply a net torque to the torque limiter that is greater than or equal to the locking torque threshold.

According to another aspect, the screw hub comprises an outer hub pivotably coupled to the lever, and an inner hub rotatably coupled to the outer hub and movably coupled to the second eccentric shaft. The inner hub is movable with respect to the second eccentric shaft in the linear direction, and rotation of the second eccentric shaft causes rotation of the inner hub.

According to another aspect, the adjustment mechanism further comprises a ball joint spherical bushing coupled between the inner hub and the screw. The inner hub is rotatable with respect to the screw, and application of the first linear force from the inner hub to the spherical bushing causes the ball joint to apply the first linear force to the screw.

According to another aspect, a vibratory mechanism for a surface compaction machine includes a housing disposed within a compactor drum of the surface compaction machine. The vibratory mechanism further includes an eccentric shaft subassembly comprising a first eccentric shaft disposed within the housing, wherein the first eccentric shaft is rotatable about an axis of rotation, the eccentric shaft comprising a first eccentric mass having a first center of mass that is offset from the axis of rotation. The eccentric shaft subassembly further includes a second eccentric shaft disposed within the housing, wherein the second eccentric shaft is rotatable about the axis of rotation, the second eccentric shaft comprising a second eccentric mass having a second center of mass that is offset from the axis of rotation. The eccentric shaft subassembly further include a ball screw subassembly comprising a ball screw coupled to the first eccentric shaft, a ball nut coupled to the second eccentric shaft, wherein the ball screw is disposed within the ball nut, and a plurality of ball bearings disposed between the ball screw and the ball nut to reduce mechanical friction between the ball screw and the ball nut. The vibratory mechanism further includes a torque limiter coupled between the first eccentric shaft and the second eccentric shaft. The torque limiter prevents relative rotation between the first eccentric shaft and the second eccentric shaft and a phase adjustment between the first eccentric shaft and the second eccentric shaft when a net torque applied to the torque limiter is less than a locking torque threshold. Application of a net torque to the torque limiter that is greater than or equal to the locking torque threshold causes the first eccentric shaft to rotate with respect to the second eccentric shaft. The vibratory mechanism further includes an actuator subassembly coupled to the ball screw to selectively apply a first linear force to the ball screw in a linear direction parallel to the axis of rotation to cause the ball screw to apply a first torque to the torque limiter via the first eccentric shaft. The vibratory mechanism further includes a motor coupled to the second eccentric shaft to apply a second torque to the torque limiter via the second eccentric shaft. The second torque does not overcome the locking torque threshold, and the first torque and the second torque cause the net torque that is greater than or equal to the locking torque threshold to cause the first eccentric shaft to rotate with respect to the second eccentric shaft.

According to another aspect, the torque limiter further comprises a ball detent mechanism to selectively lock the first eccentric shaft with respect to the second eccentric shaft in one of a plurality of rotational positions when the net torque applied to the torque limiter is less than the locking torque threshold.

According to another aspect, the torque limiter further comprises a slip clutch mechanism selectively lock the first eccentric shaft with respect to the second eccentric shaft when the net torque applied to the torque limiter is less than the locking torque threshold.

According to another aspect, the first center of mass and the second center of mass produce a combined center of mass having an effective distance from the axis of rotation. Rotation of the first eccentric shaft with respect to the second eccentric shaft changes the effective distance of the combined center of mass from a first effective distance corresponding to a first vibratory amplitude to a second effective distance (84') corresponding to a second vibratory amplitude.

According to another aspect, a sensor coupled to the torque limiter to measure a change in rotational position of the first eccentric shaft with respect to the second eccentric shaft.

According to another aspect, the actuator subassembly further comprises a linear actuator coupled to the housing, a ball screw hub coupled to the ball screw, and a lever coupled between the linear actuator and the ball screw hub. Actuation of the linear actuator causes the lever to apply the first linear force to the ball screw in the linear direction to apply the first torque to the torque limiter via the first eccentric shaft to apply a net torque to the torque limiter that is greater than or equal to the locking torque threshold.

According to another aspect, the ball screw hub comprises an outer hub pivotably coupled to the lever, and an inner hub rotatably coupled to the outer hub and movably coupled to the second eccentric shaft. The inner hub is movable with respect to the second eccentric shaft in the linear direction, and wherein rotation of the second eccentric shaft causes rotation of the inner hub.

According to another aspect, the vibratory mechanism further includes a ball joint coupled between the inner hub and the ball screw. The inner hub is rotatable with respect to the ball screw, and application of the first linear force from the inner hub to the ball joint causes the ball joint to apply the first linear force to the ball screw.

According to another aspect, the vibratory mechanism further includes a spline mechanism coupled between the ball screw and the first eccentric shaft, wherein the spline mechanism permits linear movement of the ball screw with respect to the first eccentric shaft in the linear direction, and wherein the spline mechanism prevents rotation of the ball screw with respect to the first eccentric shaft.

According to another aspect, a method of adjusting a vibratory mechanism of a surface compaction machine includes operating a motor to apply a first torque to a first eccentric shaft about an axis of rotation to rotate the first eccentric shaft. The first torque is less than a locking torque threshold of a torque limiter coupled to the first eccentric shaft. Rotating the first eccentric shaft causes concurrent rotation of a second eccentric shaft coupled to the torque limiter. The method further includes operating an actuator to selectively apply a second torque to the second eccentric shaft about the axis of rotation. The first torque and the second torque apply a net torque to the torque limiter that is greater than or equal to the locking torque threshold of the torque limiter. Applying the first torque and the second torque causes the second eccentric shaft to rotate with respect to the first eccentric shaft.

According to another aspect, a first center of mass of the first eccentric shaft and a second center of mass of the second eccentric shaft produce a combined center of mass having an effective distance from the axis of rotation. Rotation of the first eccentric shaft with respect to the second eccentric shaft changes the effective distance of the combined center of mass from a first effective distance corresponding to a first vibratory amplitude to a second effective distance corresponding to a second vibratory amplitude.

According to another aspect, the method further includes further operating the actuator to selectively remove the second torque from the second eccentric shaft about the axis of rotation to cause concurrent rotation of the second eccentric and the first eccentric shaft.

BRIEF DESCRIPTION OF THE DRAWINGS

The accompanying drawings, which are included to provide a further understanding of the disclosure and are incorporated in and constitute a part of this application, illustrate certain non-limiting embodiments of inventive concepts. In the drawings.

DETAILED DESCRIPTION OF EMBODIMENTS

Figure 1:
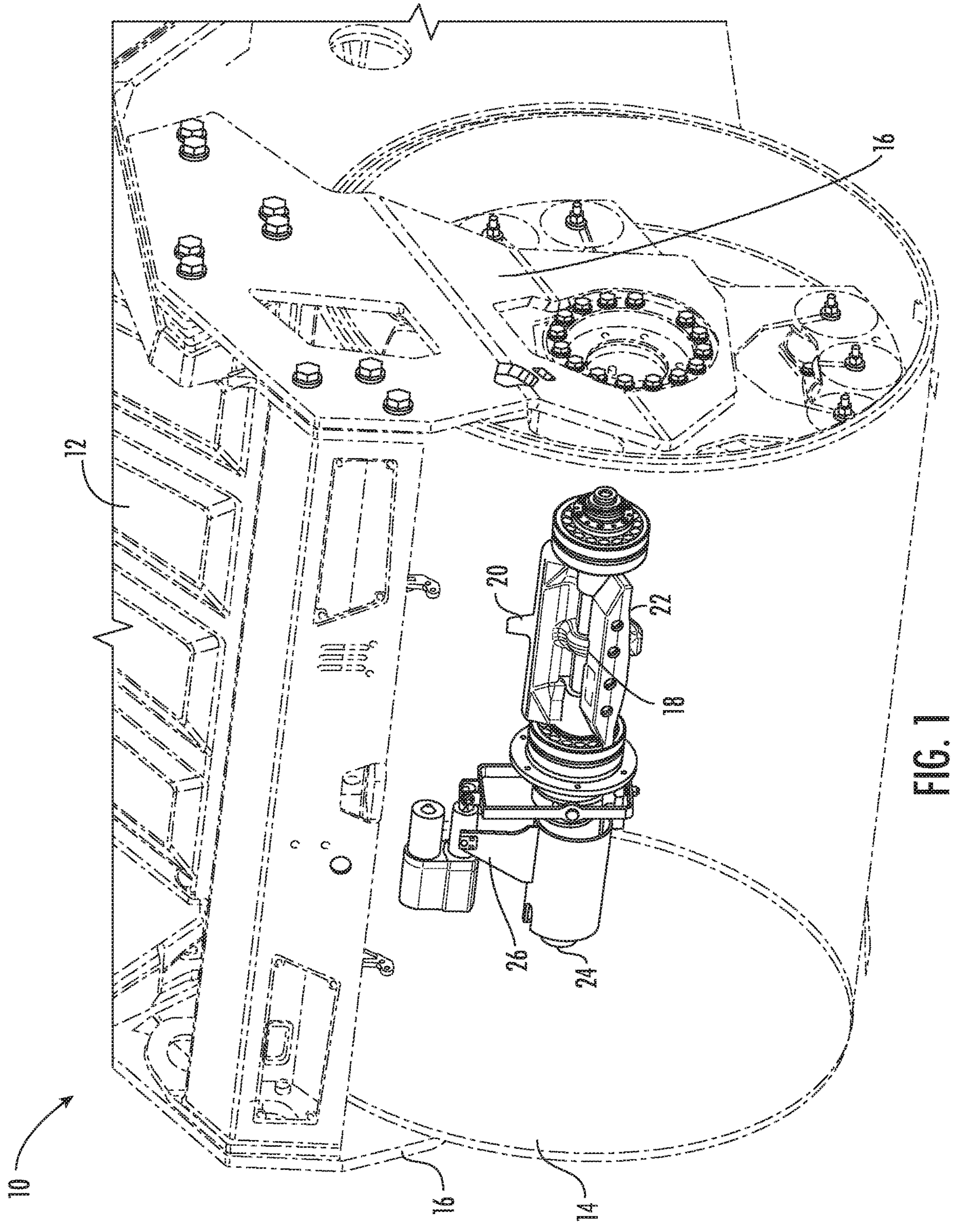
FIG. 1 is an isometric view of a vibratory mechanism in a drum of a surface compaction machine having an adjustment mechanism for selectively modifying a vibratory amplitude of the vibratory mechanism, according to some embodiments.

FIG. 1 is an isometric view of a vibratory mechanism 18 in a drum 14 of a surface compaction machine 10. The surface compaction machine 10, which may also be referred to herein as a vibratory compaction machine or a roller compactor, includes a body chassis structure 12, and one or more rotatable drums 14 coupled to the body chassis structure 12 using a yoke 16. The drum 14 may be driven by a drive motor (not shown) to propel the surface compaction machine 10. In this example, the cylindrical drum 14 is used to compact an underlying substrate, such as asphalt, gravel, soil, etc. Those of ordinary skill in the art will appreciate, however, that other types of surface compaction machines are contemplated, such as a surface compaction machine with multiple drums, for example, or other types of surface compaction machines and other equipment that utilize directional vibration energy.

A vibratory mechanism 18 that generates vibration energy is mounted within the drum 14. In this example, as discussed in greater detail below, the vibratory mechanism 18 is an eccentric vibration system having a drive motor 24 that rotates eccentric masses 20, 22 to generate vibration energy, which causes the drum 14 to vibrate against the substrate to aid in compacting the substrate. Other types of vibration systems may be used within the drum 14 and/or at other locations of the surface compaction machine 10, as well.

Figure 2:
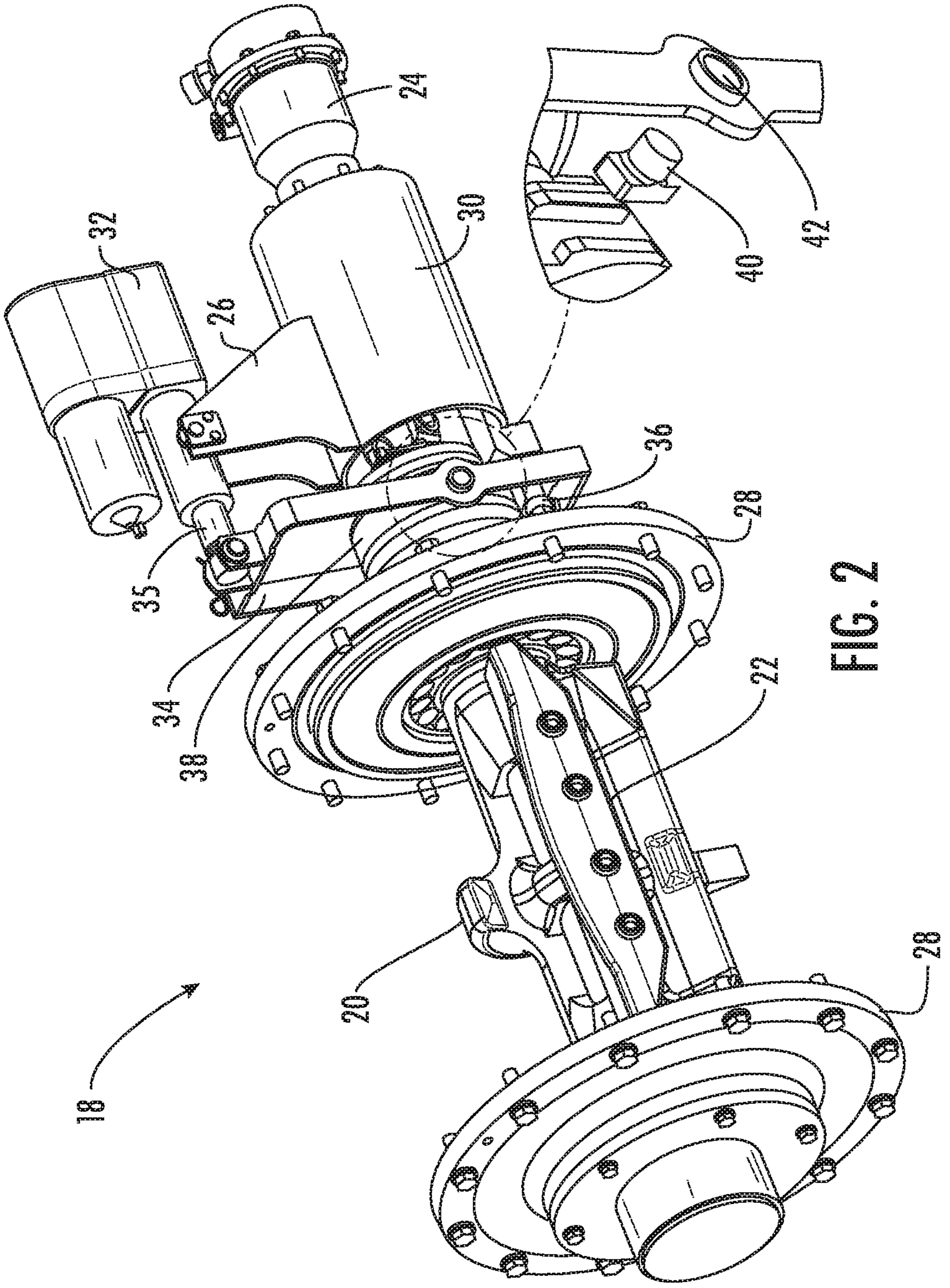
FIG. 2 is an isometric view of the vibratory mechanism of FIG. 1 illustrating components of the vibratory mechanism and adjustment mechanism, according to some embodiments.

Referring now to FIG. 2, an isometric view of the vibratory mechanism 18 of FIG. 1 illustrates additional components of the vibratory mechanism 18 and adjustment mechanism 26, according to some embodiments. The vibratory mechanism 18 includes a pair of hubs 28 that may be coupled to the drum 14, body chassis structure 12, and/or other structure of the surface compaction machine 10 to secure the vibratory mechanism 18 within the drum 14.

The eccentric masses 20, 22 are rotatably mounted between the hubs 28 via respective outer and inner eccentric shafts 46, 48 (See FIG. 3) that rotate about a common axis of rotation. Each eccentric mass 20, 22 has a center of mass that is offset from the axis of rotation. Based on the relative rotational positions of the eccentric masses 20, 22 with respect to each other, the centers of mass of the eccentric masses 20, 22 produce an effective center of mass that is an effective distance from the axis of rotation.

In this embodiment, the drive motor 24 rotates the eccentric masses 20, 22 about the axis of rotation at a common rotational speed to produce vibration energy at a particular frequency (based on the rotational speed) and amplitude (based on the effective distance of the effective center of mass of the eccentric masses 20, 22). Those of ordinary skill in the art will appreciate that it is desirable to selectively produce vibration energy at different amplitudes and/or frequencies. The frequency of the vibration energy can be selectively adjusted by varying the rotational speed of the drive motor 24. As will be discussed in greater detail below, the amplitude of the vibration energy can be selectively adjusted by operating an adjustment mechanism 26 to vary the relative rotational positions of the eccentric masses 20, 22 to modify an effective center of mass of the eccentric masses 20, 22 with respect to an axis of rotation of the eccentric masses 20, 22.

As shown in FIG. 2, the adjustment mechanism 26 includes a housing 30 that is fixed with respect to the drive motor 24 and that supports an actuator subassembly 32. A lever 34 is coupled between the actuator subassembly 32 and a ball joint 36 that is fixed to the housing 30. The lever is also pivotally connected to an outer hub 38 via a stone 40 and bushing 42 connection. Actuating the actuator subassembly 32 causes a linear actuator shaft 35 to pivot the lever about the ball joint 36, which causes the outer hub 38 to move in a linear direction parallel to the axis of rotation of the eccentric masses 20, 22. It should also be understood that other mechanisms may be used to apply the torque to cause the inner eccentric shaft 48 and outer eccentric shaft 46 to rotate with respect to each other. For example, in some embodiments, a linear actuator may selectively apply the linear force directly to the outer hub 38, or an actuator may selectively apply a rotational force directly to the inner eccentric shaft 48 or outer eccentric shaft 46 to cause the relative rotation.

As will be described below with respect to FIGS. 3 and 4, the linear movement of the outer hub 38 applies a torque to the inner eccentric shaft 48 to cause the inner eccentric shaft 48 and outer eccentric shaft 46 to rotate with respect to each other. As will be described in greater detail with respect to FIGS. 5A-6B, this relative rotation of the outer eccentric shaft 46 and inner eccentric shaft 48 changes the effective distance of the effective center of mass of the eccentric masses 20, 22, thereby changing the vibratory amplitude of the vibratory mechanism 18.

Figure 3:
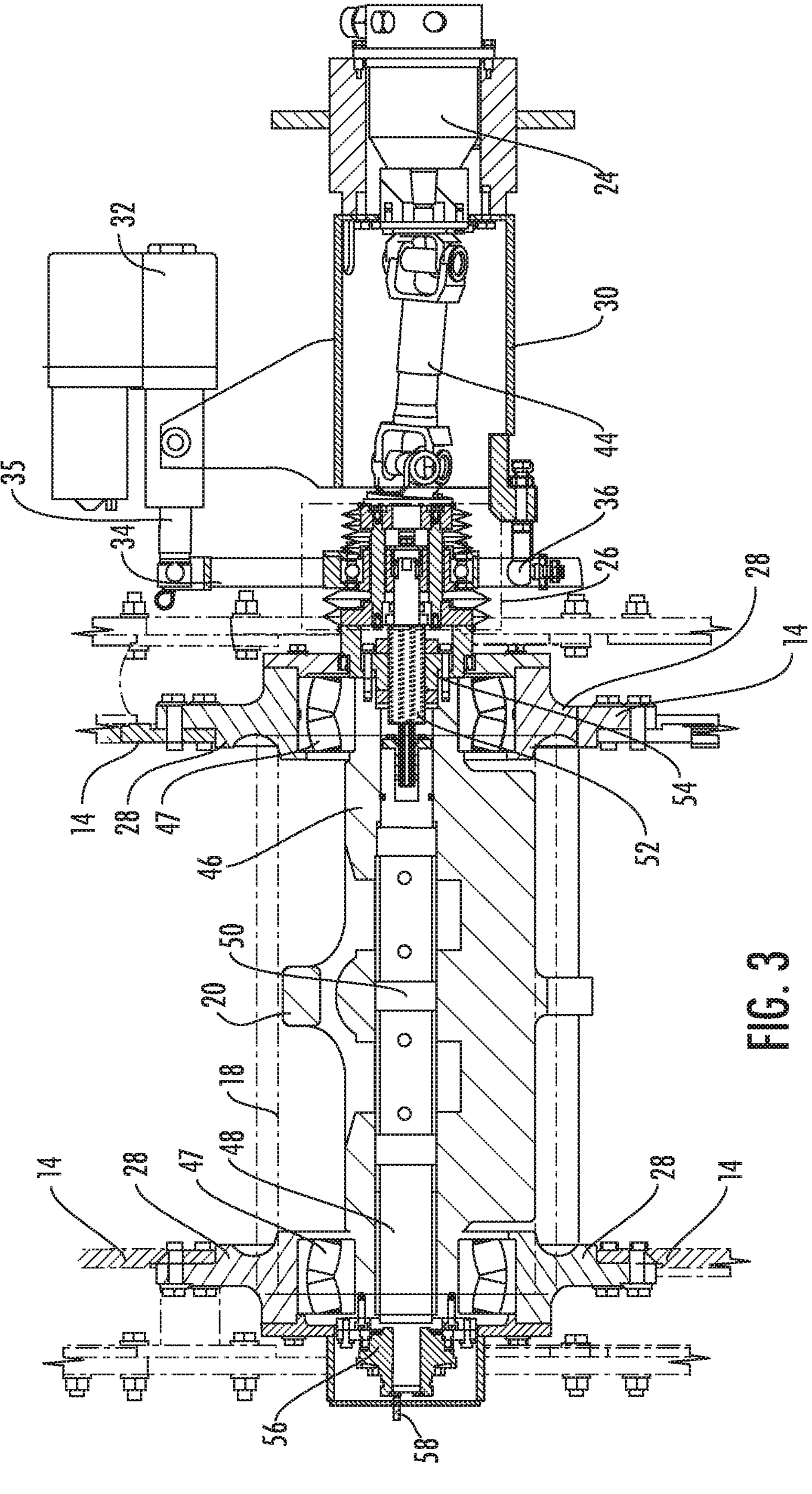
FIG. 3 is a cross-sectional view of the vibratory mechanism of FIGS. 1 and 2 illustrating additional components of the vibratory mechanism and adjustment mechanism, according to some embodiments.
Figure 4:
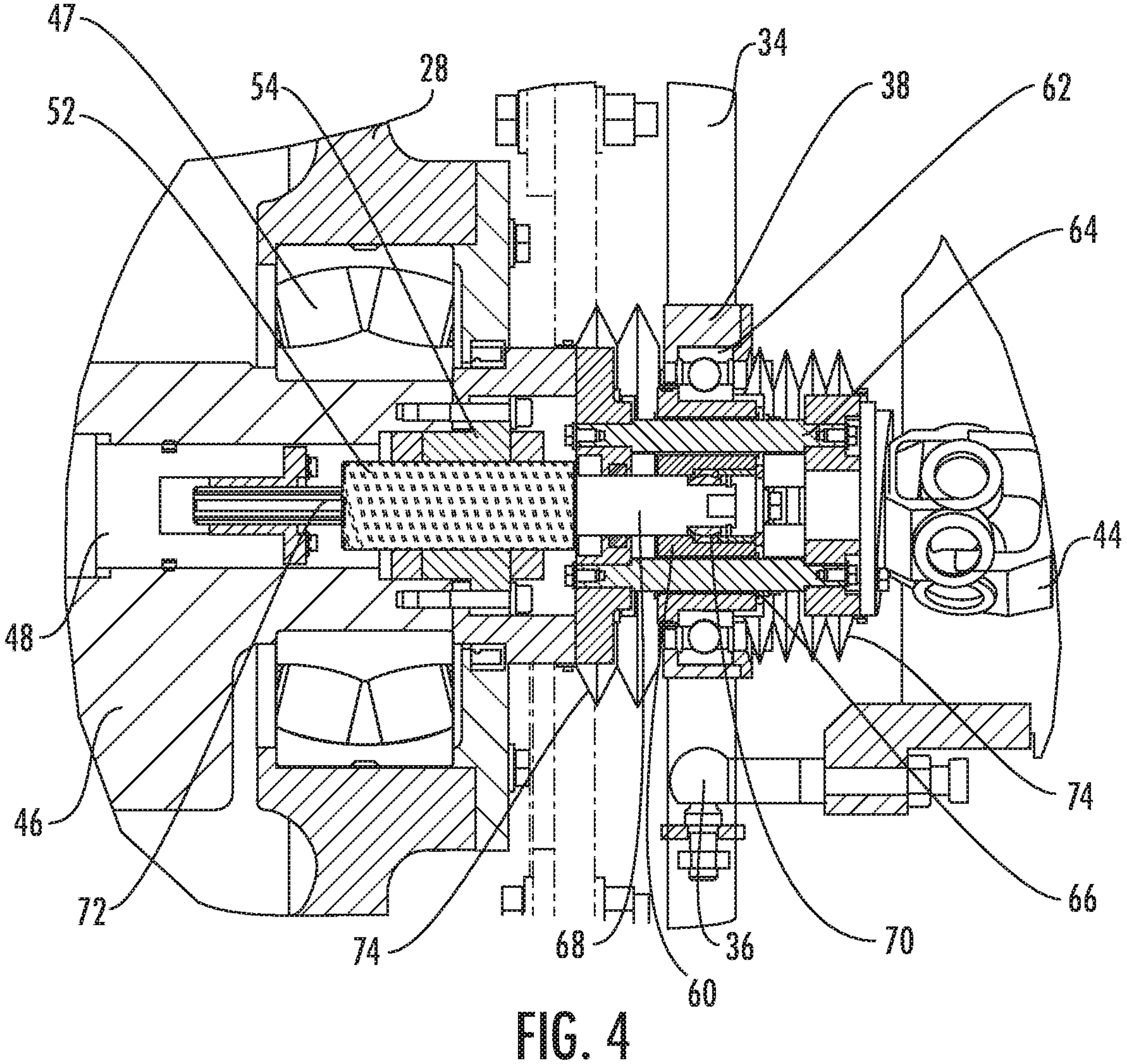
FIG. 4 is a detailed cross-sectional view of the adjustment mechanism of FIGS. 1-3 illustrating additional components of the adjustment mechanism, according to some embodiments.

Referring now to FIGS. 3 and 4, cross-sectional views of the vibratory mechanism 18 of FIGS. 1 and 2 illustrate additional components of the vibratory mechanism 18 and adjustment mechanism 26, according to some embodiments. During operation of the vibratory mechanism in this embodiment, the drive motor 24 drives a cardan shaft 44, which in turn drives the outer eccentric shaft 46 to rotate the first eccentric mass 20. The outer eccentric shaft 46 is coupled to the inner eccentric shaft 48 via a torque limiter 56 that has a locking torque threshold. Application of a net torque to the torque limiter that is less than the locking torque threshold prevents relative rotation between the outer eccentric shaft 46 and the inner eccentric shaft 48 and a phase adjustment between the outer eccentric shaft 46 and the inner eccentric shaft 48. The torque applied by the drive motor to the torque limiter via the outer eccentric shaft 46 in this operation is less than the locking torque threshold of the torque limiter 56, and the inner eccentric shaft 48 and outer eccentric shaft 46 rotate together. In this example, the inner eccentric shaft 48 and outer eccentric shaft 46 are supported within the hubs 28 by roller bearings 47, which facilitate rotation of the inner eccentric shaft 48 and outer eccentric shaft 46 with respect to the hubs 28.

However, application of a net torque to the torque limiter 56 that is greater than or equal to the locking torque threshold causes the outer eccentric shaft 46 and inner eccentric shaft 48 to rotate with respect to each other to change the relative rotational positions of the eccentric masses 20, 22. In this regard, actuation of the actuator subassembly 32 causes the outer hub 38 to apply a linear force to a ball screw 52 coupled to the inner eccentric shaft 48. The ball screw 52 is disposed within a ball nut 54 coupled to the outer eccentric shaft 46, such that the linear force applied to the ball screw 52 causes the ball screw 52 to apply an additional torque to the torque limiter 56 via the inner eccentric shaft 48. The additional torque causes the net torque applied to the torque limiter 56 to overcome the locking torque threshold, thereby causing the inner eccentric shaft 48 to rotate with respect to the outer eccentric shaft 46. In this example at least two needle bearings 50 are disposed between the inner eccentric shaft 48 and outer eccentric shaft 46 to facilitate rotation of the inner eccentric shaft 48 and outer eccentric shaft 46 with respect to each other.

A sensor 58 is coupled to the torque limiter 56 to detect rotation of the inner eccentric shaft 48 and outer eccentric shaft 46 with respect to each other. The sensor 58 may be used to control the actuator subassembly 32 to obtain a desired vibratory amplitude for the vibratory mechanism 18.

Referring now to FIG. 4, a detailed cross-sectional view of the adjustment mechanism 26 of FIGS. 1-3 illustrates additional components of the adjustment mechanism 26, according to some embodiments. The cardan shaft 44 is coupled to the outer eccentric shaft 46 via a plurality of rails 64. A screw hub 60 is coupled to the rails 64 via bushings 66 such that the screw hub 60 is moveable with respect to the rails 64 in a linear direction parallel to the axis of rotation. The screw hub 60 is coupled to the outer hub 38 via a plurality of bearings 62 that transfer linear force between the outer hub 38 and screw hub 60 while allowing the screw hub 60 to rotate freely with respect to the outer hub 38. A screw shaft 68 coupled to the ball screw 52 is coupled to the screw hub 60 via a spherical bushing 70, which transfers linear force between the screw hub 60 and the ball screw 52 while allowing the screw hub 60 to rotate freely with respect to the screw shaft 68 and ball screw 52. In some embodiments, a thrust bearing may be substituted for the spherical bushing 70. The ball screw 52 is coupled to the inner eccentric shaft 48 via a spline connection 72, which transfers torque between the ball screw 52 and the inner eccentric shaft 48 while allowing linear movement of the ball screw 52 with respect to the inner eccentric shaft 48. In this embodiment, one or more flexible covers 74, such as a rubber cover, may enclose components of the adjustment mechanism 26 while allowing linear movement of the screw hub 60 and outer hub 38 along the rails 64.

Figure 5B:
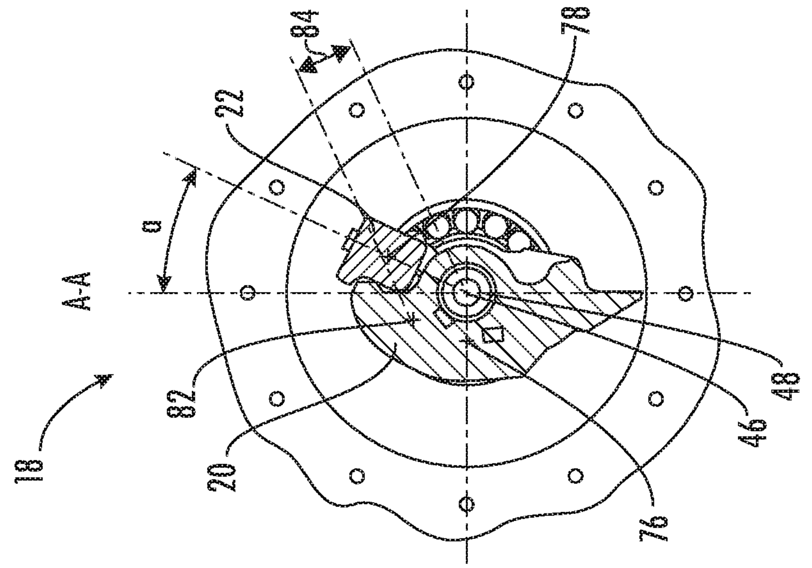
FIGS. 5A and 5B are a side view and cross-sectional view of the vibratory mechanism of FIGS. 1-4, wherein the adjustment mechanism causes relative rotation of the eccentric masses of the vibratory mechanism to correspond to a first vibratory amplitude, according to some embodiments.
Figure 5A:
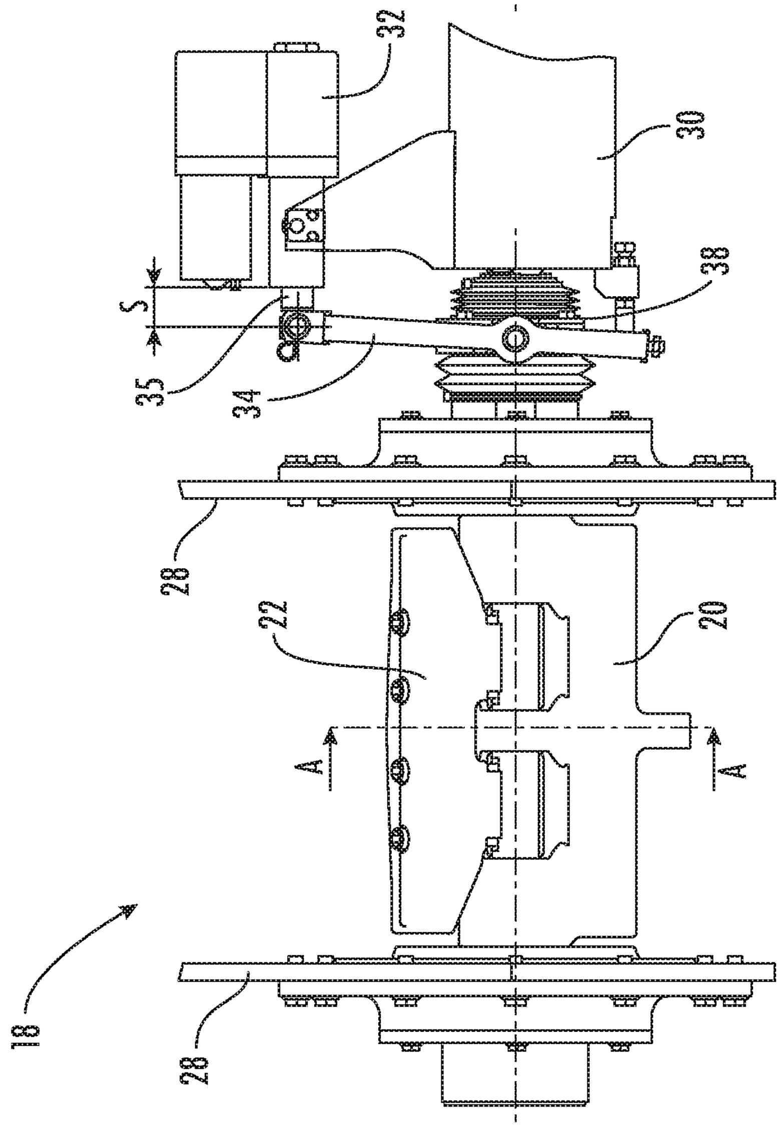

FIGS. 5A and 5B are a side view and cross-sectional view of the vibratory mechanism 18 of FIGS. 1-4, wherein the actuator subassembly 32 causes relative rotation of the eccentric masses 20, 22 of the vibratory mechanism 18 to correspond to a first vibratory amplitude, according to some embodiments. As shown by FIG. 5A, the linear actuator shaft 35 is at a first position that causes the outer eccentric shaft 46 and the inner eccentric shaft 48 to rotate relative to each other to produce a first phase angle $\alpha$1. As shown by FIG. 5B, which is a cross sectional view of the vibratory mechanism 18 at line A-A at the first phase angle $\alpha$1, the first center of mass 76 of the first eccentric mass 20 and the second center of mass 78 of the second eccentric mass 22 produce a first combined center of mass 82 having a first effective distance 84 from the axis of rotation corresponding to a first vibratory amplitude for the vibratory mechanism 18.

Figure 6B:
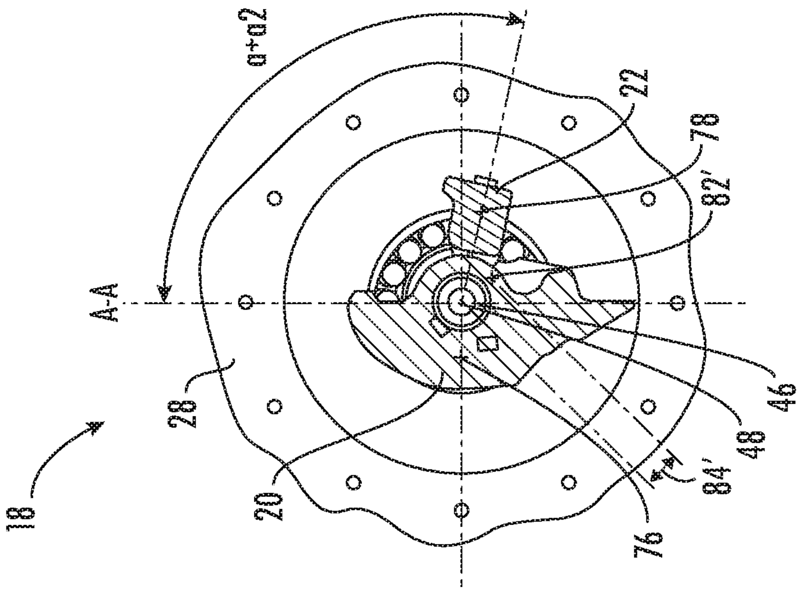
FIGS. 6A and 6B are a side view and cross-sectional view of the vibratory mechanism of FIGS. 1-5B, wherein the adjustment mechanism causes relative rotation of the eccentric masses of the vibratory mechanism to correspond to a second vibratory amplitude, according to some embodiments.
Figure 6A:
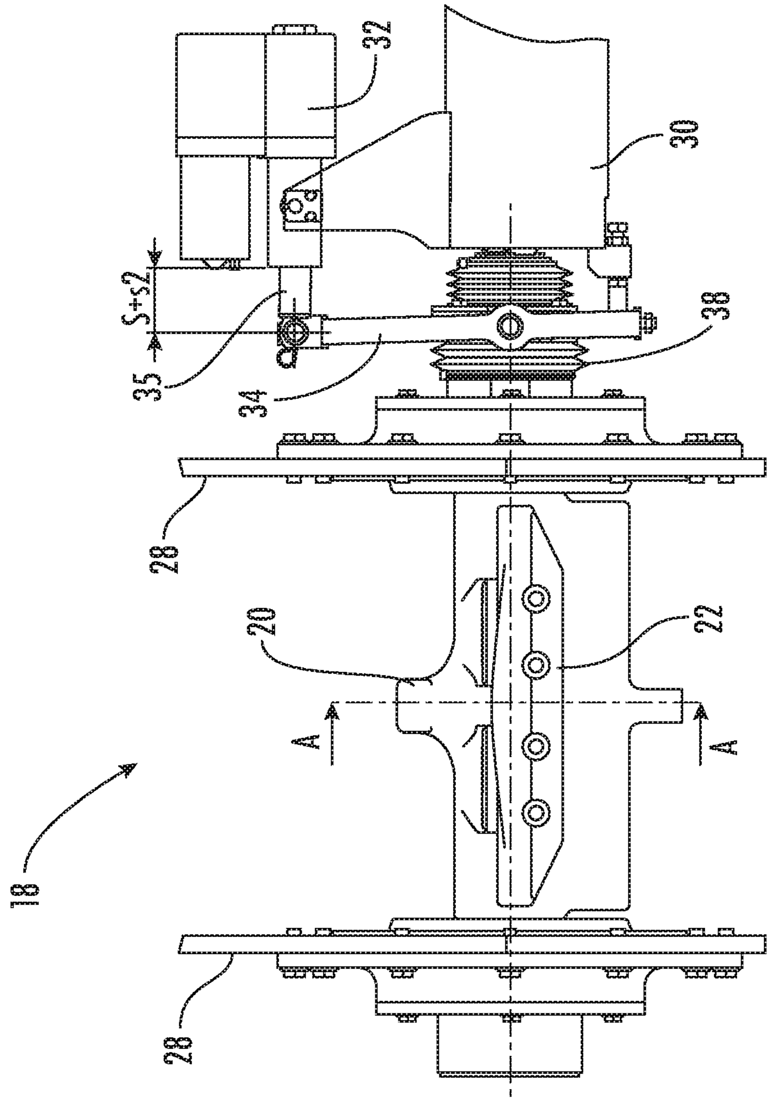

FIGS. 6A and 6B are a side view and cross-sectional view of the vibratory mechanism 18 of FIGS. 1-5B at a second phase angle $\alpha$2. As shown by FIG. 6A, the linear actuator shaft 35 is moved to a second position that causes the outer eccentric shaft 46 and the inner eccentric shaft 48 to rotate relative to each other to produce the second phase angle $\alpha$2. As shown by FIG. 6B, relative rotation of the first center of mass 76 of the first eccentric mass 20 and the second center of mass 78 of the second eccentric mass 22 produce a second combined center of mass 82' having a second effective distance 84' from the axis of rotation corresponding to a second vibratory amplitude for the vibratory mechanism 18.

Figure 7:
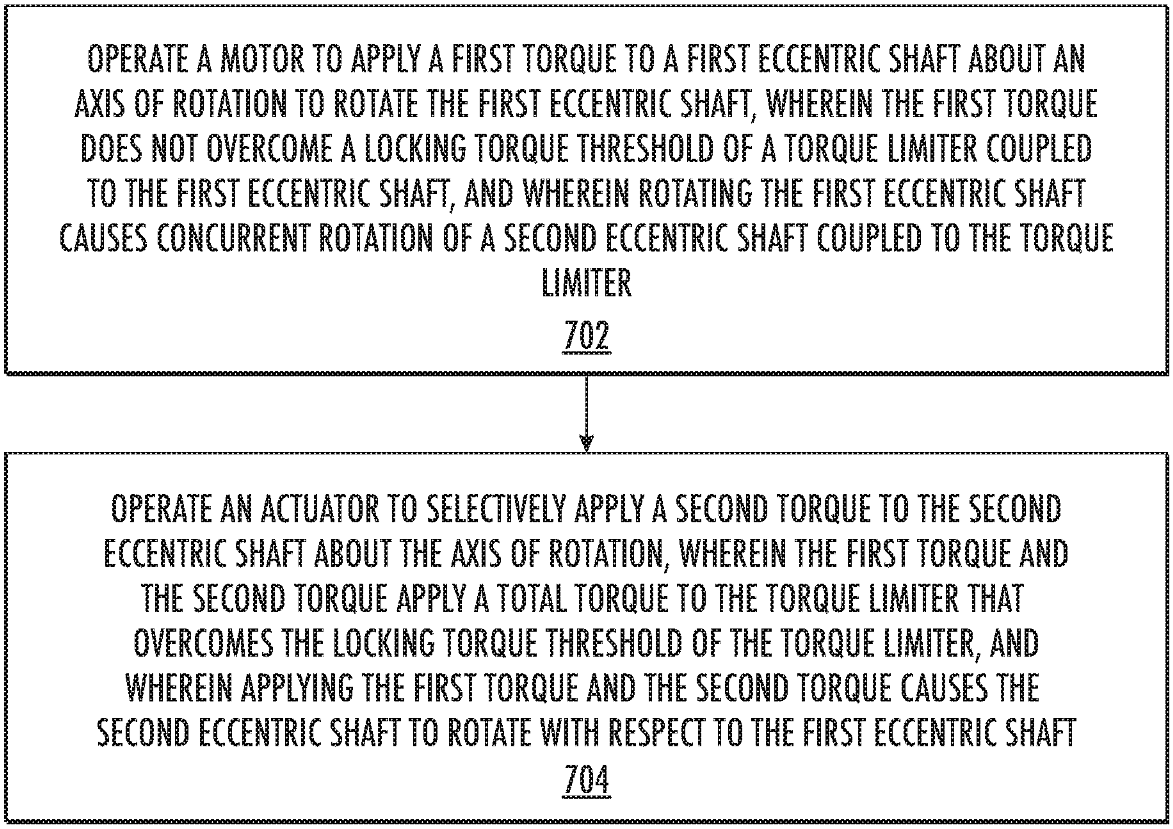
FIG. 7 is a flowchart of operations for a method of adjusting the vibratory mechanism of FIGS. 1-6B, according to some embodiments.

FIG. 7 is a flowchart of operations 700 for a method of adjusting the vibratory mechanism 18 of FIGS. 1-6B, according to some embodiments. The operations 700 include operating a motor to apply a first torque to a first eccentric shaft about an axis of rotation to rotate the first eccentric shaft, wherein the first torque is less than a locking torque threshold of a torque limiter coupled to the first eccentric shaft, and wherein rotating the first eccentric shaft causes concurrent rotation of a second eccentric shaft coupled to the torque limiter (Block 702). The operations 700 further include operating an actuator to selectively apply a second torque to the second eccentric shaft about the axis of rotation, wherein the first torque and the second torque apply a net torque to the torque limiter that is greater than or equal to the locking torque threshold of the torque limiter, and wherein applying the first torque and the second torque causes the second eccentric shaft to rotate with respect to the first eccentric shaft (Block 704).

These and other embodiments may have several advantages. For example, using a torque limiter allows the amplitude of the vibratory mechanism to be dynamically adjusted during operation of the vibratory mechanism and surface compaction machine. In addition, using a torque limiter helps prevent unintentional rotation of the shafts with respect to each other during operation, and allows for secure locking of the shafts with respect to each other in a non-static environment that is subject to vibration and temperature fluctuations. The torque limiter also helps to reduce wear on the ball screw and linear actuator, and may allow for greater rotational precision. Another advantage is that the amplitude of the vibratory mechanism can be dynamically adjusted during operation.

When an element is referred to as being "connected", "coupled", "responsive", "mounted", or variants thereof to another element, it can be directly connected, coupled, responsive, or mounted to the other element or intervening elements may be present. In contrast, when an element is referred to as being "directly connected", "directly coupled", "directly responsive", "directly mounted" or variants thereof to another element, there are no intervening elements present. Like numbers refer to like elements throughout. As used herein, the singular forms "a", "an" and "the" are intended to include the plural forms as well, unless the context clearly indicates otherwise. Well-known functions or constructions may not be described in detail for brevity and/or clarity. The term "and/or" and its abbreviation "/" include any and all combinations of one or more of the associated listed items.

It will be understood that although the terms first, second, third, etc. may be used herein to describe various elements/operations, these elements/operations should not be limited by these terms. These terms are only used to distinguish one element/operation from another element/operation. Thus, a first element/operation in some embodiments could be termed a second element/operation in other embodiments without departing from the teachings of present inventive concepts. The same reference numerals or the same reference designators denote the same or similar elements throughout the specification.

As used herein, the terms "comprise", "comprising", "comprises", "include", "including", "includes", "have", "has", "having", or variants thereof are open-ended, and include one or more stated features, integers, elements, steps, components or functions but do not preclude the presence or addition of one or more other features, integers, elements, steps, components, functions or groups thereof. Furthermore, as used herein, the common abbreviation "e.g.", which derives from the Latin phrase "exempli gratia," may be used to introduce or specify a general example or examples of a previously mentioned item, and is not intended to be limiting of such item. The common abbreviation "i.e.", which derives from the Latin phrase "id est," may be used to specify a particular item from a more general recitation.

Persons skilled in the art will recognize that certain elements of the above-described embodiments may variously be combined or eliminated to create further embodiments, and such further embodiments fall within the scope and teachings of inventive concepts. It will also be apparent to those of ordinary skill in the art that the above-described embodiments may be combined in whole or in part to create additional embodiments within the scope and teachings of inventive concepts. Thus, although specific embodiments of, and examples for, inventive concepts are described herein for illustrative purposes, various equivalent modifications are possible within the scope of inventive concepts, as those skilled in the relevant art will recognize. Accordingly, the scope of inventive concepts is determined from the appended claims and equivalents thereof.

The invention claimed is:

1. An adjustment mechanism for a vibratory mechanism of a surface compaction machine, the adjustment mechanism comprising:

a screw coupled to a first eccentric shaft that is rotatable about an axis of rotation;

a nut coupled to a second eccentric shaft that is rotatable about the axis of rotation, wherein the screw is disposed within the nut;

a torque limiter coupled between the first eccentric shaft and the second eccentric shaft, wherein the torque limiter prevents relative rotation between the first eccentric shaft and the second eccentric shaft and a phase adjustment between the first eccentric shaft and the second eccentric shaft when a net torque applied to the torque limiter is less than a locking torque threshold, and wherein application of a net torque to the torque limiter that is greater than or equal to the locking torque threshold causes the first eccentric shaft to rotate with respect to the second eccentric shaft; and an actuator subassembly coupled to the screw to selectively apply a first linear force to the screw in a linear direction parallel to the axis of rotation to cause the screw to apply a first torque to the first eccentric shaft, wherein application of the first torque to the first eccentric shaft causes the first eccentric shaft to apply the first torque to the first eccentric shaft sufficient to apply a net torque to the torque limiter that is greater than or equal to the locking torque threshold to cause the first eccentric shaft to rotate with respect to the second eccentric shaft.

2. The adjustment mechanism of claim 1, wherein the screw comprises a ball screw, wherein the nut comprises a ball nut, and wherein the adjustment mechanism further comprises a plurality of ball bearings disposed between the ball screw and the ball nut to reduce mechanical friction between the ball screw and the ball nut.

3. The adjustment mechanism of claim 1, wherein the torque limiter further comprises a ball detent mechanism to selectively lock the first eccentric shaft with respect to the second eccentric shaft in one of a plurality of rotational positions when the net torque applied to the torque limiter is less than the locking torque threshold.

4. The adjustment mechanism of claim 1, wherein the torque limiter further comprises a slip clutch mechanism to selectively lock the first eccentric shaft with respect to the second eccentric shaft when the net torque applied to the torque limiter is less than the locking torque threshold.

5. The adjustment mechanism of claim 1, further comprising a sensor coupled to the torque limiter to measure a change in rotational position of the first eccentric shaft with respect to the second eccentric shaft.

6. The adjustment mechanism of claim 1, wherein the actuator subassembly further comprises:

a linear actuator;

a screw hub coupled to the screw; and a lever coupled between the linear actuator and the screw hub, wherein actuation of the linear actuator causes the lever to apply the first linear force to the screw to apply a net torque to the torque limiter that is greater than or equal to the locking torque threshold.

7. The adjustment mechanism of claim 6, wherein the screw hub comprises:

an outer hub pivotably coupled to the lever; and an inner hub rotatably coupled to the outer hub and movably coupled to the second eccentric shaft, wherein the inner hub is movable with respect to the second eccentric shaft in the linear direction, and wherein rotation of the second eccentric shaft causes rotation of the inner hub.

8. The adjustment mechanism of claim 7, further comprising a ball joint spherical bushing coupled between the inner hub and the screw, wherein the inner hub is rotatable with respect to the screw, and wherein application of the first linear force from the inner hub to the spherical bushing causes the ball joint to apply the first linear force to the screw.

9. A vibratory mechanism for a surface compaction machine, the vibratory mechanism comprising:

a housing disposed within a compactor drum of the surface compaction machine;

an eccentric shaft subassembly comprising:

a first eccentric shaft disposed within the housing, wherein the first eccentric shaft is rotatable about an axis of rotation, the eccentric shaft comprising a first eccentric mass having a first center of mass that is offset from the axis of rotation; and a second eccentric shaft disposed within the housing, wherein the second eccentric shaft is rotatable about the axis of rotation, the second eccentric shaft comprising a second eccentric mass having a second center of mass that is offset from the axis of rotation;

a ball screw subassembly comprising:

a ball screw coupled to the first eccentric shaft;

a ball nut coupled to the second eccentric shaft, wherein the ball screw is disposed within the ball nut; and a plurality of ball bearings disposed between the ball screw and the ball nut to reduce mechanical friction between the ball screw and the ball nut;

a torque limiter coupled between the first eccentric shaft and the second eccentric shaft, wherein the torque limiter prevents relative rotation between the first eccentric shaft and the second eccentric shaft and a phase adjustment between the first eccentric shaft and the second eccentric shaft when a net torque applied to the torque limiter is less than a locking torque threshold, and wherein application of a net torque to the torque limiter that is greater than or equal to the locking torque threshold causes the first eccentric shaft to rotate with respect to the second eccentric shaft; and an actuator subassembly coupled to the ball screw to selectively apply a first linear force to the ball screw in a linear direction parallel to the axis of rotation to cause the ball screw to apply a first torque to the torque limiter via the first eccentric shaft; and a motor coupled to the second eccentric shaft to apply a second torque to the torque limiter via the second eccentric shaft, wherein the second torque does not overcome the locking torque threshold, and wherein the first torque and the second torque cause the net torque that is greater than or equal to the locking torque threshold to cause the first eccentric shaft to rotate with respect to the second eccentric shaft.

10. The vibratory mechanism of claim 9, wherein the torque limiter further comprises a ball detent mechanism to selectively lock the first eccentric shaft with respect to the second eccentric shaft in one of a plurality of rotational positions when the net torque applied to the torque limiter is less than the locking torque threshold.

11. The vibratory mechanism of claim 9, wherein the torque limiter further comprises a slip clutch mechanism selectively lock the first eccentric shaft with respect to the second eccentric shaft when the net torque applied to the torque limiter is less than the locking torque threshold.

12. The vibratory mechanism of claim 9, wherein the first center of mass and the second center of mass produce a combined center of mass having an effective distance from the axis of rotation, and wherein rotation of the first eccentric shaft with respect to the second eccentric shaft changes the effective distance of the combined center of mass from a first effective distance corresponding to a first vibratory amplitude to a second effective distance (84 ') corresponding to a second vibratory amplitude.

13. The vibratory mechanism of claim 9, further comprising a sensor coupled to the torque limiter to measure a change in rotational position of the first eccentric shaft with respect to the second eccentric shaft.

14. The vibratory mechanism of claim 9, wherein the actuator subassembly further comprises:

a linear actuator coupled to the housing;

a ball screw hub coupled to the ball screw; and a lever coupled between the linear actuator and the ball screw hub, and wherein actuation of the linear actuator causes the lever to apply the first linear force to the ball screw in the linear direction to apply the first torque to the torque limiter via the first eccentric shaft to apply a net torque to the torque limiter that is greater than or equal to the locking torque threshold.

15. The vibratory mechanism of claim 14, wherein the ball screw hub comprises:

an outer hub pivotably coupled to the lever; and an inner hub rotatably coupled to the outer hub and movably coupled to the second eccentric shaft, wherein the inner hub is movable with respect to the second eccentric shaft in the linear direction, and wherein rotation of the second eccentric shaft causes rotation of the inner hub.

16. The vibratory mechanism of claim 15, further comprising a ball joint coupled between the inner hub and the ball screw, wherein the inner hub is rotatable with respect to the ball screw, and wherein application of the first linear force from the inner hub to the ball joint causes the ball joint to apply the first linear force to the ball screw.

17. The vibratory mechanism of claim 9, further comprising:

a spline mechanism coupled between the ball screw and the first eccentric shaft, wherein the spline mechanism permits linear movement of the ball screw with respect to the first eccentric shaft in the linear direction, and wherein the spline mechanism prevents rotation of the ball screw with respect to the first eccentric shaft.

18. A method of adjusting a vibratory mechanism of a surface compaction machine, the method comprising:

operating a motor to apply a first torque to a first eccentric shaft about an axis of rotation to rotate the first eccentric shaft, wherein the first torque is less than a locking torque threshold of a torque limiter coupled to the first eccentric shaft, and wherein rotating the first eccentric shaft causes concurrent rotation of a second eccentric shaft coupled to the torque limiter; and operating an actuator to selectively apply a second torque to the second eccentric shaft about the axis of rotation, wherein the first torque and the second torque apply a net torque to the torque limiter that is greater than or equal to the locking torque threshold of the torque limiter, and wherein applying the first torque and the second torque causes the second eccentric shaft to rotate with respect to the first eccentric shaft.

19. The method of claim 18, wherein a first center of mass of the first eccentric shaft and a second center of mass of the second eccentric shaft produce a combined center of mass having an effective distance from the axis of rotation, and wherein rotation of the first eccentric shaft with respect to the second eccentric shaft changes the effective distance of the combined center of mass from a first effective distance corresponding to a first vibratory amplitude to a second effective distance corresponding to a second vibratory amplitude.

20. The method of claim 18, further operating the actuator to selectively remove the second torque from the second eccentric shaft about the axis of rotation to cause concurrent rotation of the second eccentric and the first eccentric shaft.

* * * * *